United States Patent
Park et al.

(10) Patent No.: US 11,479,648 B2
(45) Date of Patent: Oct. 25, 2022

(54) METHOD OF MANUFACTURING POLYMER FILM AND POLYMER FILM COMPOSITION

(71) Applicant: ELECTRONICS AND TELECOMMUNICATIONS RESEARCH INSTITUTE, Daejeon (KR)

(72) Inventors: Seung Koo Park, Sejong (KR); Bong Je Park, Daejeon (KR); Mee Jeong Choi, Daejeon (KR); Suntak Park, Daejeon (KR); Eun Jin Shin, Sejong (KR); Sungryul Yun, Daejeon (KR); Jae Woong Yoon, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 216 days.

(21) Appl. No.: 16/888,325

(22) Filed: May 29, 2020

(65) Prior Publication Data
US 2021/0198439 A1 Jul. 1, 2021

(30) Foreign Application Priority Data
Dec. 27, 2019 (KR) .................. 10-2019-0176236

(51) Int. Cl.
*C08J 5/18* (2006.01)

(52) U.S. Cl.
CPC ............. *C08J 5/18* (2013.01); *C08J 2383/04* (2013.01); *C08J 2483/04* (2013.01)

(58) Field of Classification Search
CPC .......... C08G 77/12; C08G 77/20; C08L 83/04
See application file for complete search history.

(56) References Cited

U.S. PATENT DOCUMENTS

| | | | |
|---|---|---|---|
| 9,825,226 B2 | 11/2017 | Fun et al. | |
| 9,982,134 B2 | 5/2018 | Stepp et al. | |
| 10,590,248 B2 | 3/2020 | Lee et al. | |
| 2009/0029149 A1 | 1/2009 | Kim et al. | |
| 2016/0194455 A1* | 7/2016 | Mateu ............ | C08L 83/00 528/25 |
| 2020/0032013 A1 | 1/2020 | Park et al. | |

FOREIGN PATENT DOCUMENTS

| | | |
|---|---|---|
| KR | 1020130080992 A | 7/2013 |
| KR | 1020170037367 A | 4/2017 |
| KR | 101825076 B1 | 2/2018 |
| KR | 1020180118038 A | 10/2018 |

OTHER PUBLICATIONS

Caspari et al., "Dielectric elastomer actuators with increased dielectric permittivity and low leakage current capable of suppressing electromechanical instability," J. Mater. Chem. C, 2018, vol. 6, pp. 2043-2053.
Dirany et al., "Colloid Surfaces A: Physicochemical and Engineering Aspects," Elsevier, 2015, vol. 468, pp. 174-183.
Lee et al., "Electrical Energy Generated by Silicone Elastomers Filled with Nanospring-Carbon-Nanotubes," J. Mater. Chem. C., 2019, pp. 1-9.
Liu et al., "Mechanical, Dielectric, and Actuated Strain of Silicone Elastomer Filled with Various Types of TiO2," Soft Materials, 2013, vol. 11, pp. 363-370.
Madsen et al., "A new soft dielectric silicone elastomer matrix with high mechanical integrity and low losses," RSC Advances, 2015, vol. 5, pp. 10254-10259.
Park et al., "Facile Functionalization of Poly(Dimethylsiloxane) Elastomer by Varying Content of Hydridosilyl Groups in a Crosslinker," Polymers, 2019, vol. 11, 1842, pp. 1-11.
"PDMS Market by Type (LMW, HMW, UHMW), Form (Elastomers, Fluids, Resins), End-Use Industries (Industrial Process, Building & Construction, Household & Personal Care, Electrical & Electronics, Transportation, Healthcare) and Region—Global Forecast to 2024," PDMS Market, 2019, pp. 1-5.
Pelrine et al., "High-Speed Electrically Actuated Elastomers with Strain Greater Than 100%," Science, 2000, vol. 287, pp. 836-839.
Quinsaat et al., "Highly stretchable dielectric elastomer composites containing high volume fractions of silver nanoparticles," J. Mater. Chem. A, 2015, vol. 3, pp. 14675-14685.
Zheng et al., "Rediscovering Silicones: Molecularly Smooth, Low Surface Energy, Unfilled, UV/Vis-Transparent, Extremely Cross-Linked, Thermally Stable, Hard, Elastic PDMS," Langmuir, 2010, pp. 18585-18590.
Park et al., "A highly transparent, stretchable organic-inorganic hybrid elastomer for focus-tunable optical lenses," European Materials Research Society, 2019.

* cited by examiner

*Primary Examiner* — Kuo Liang Peng

(57) ABSTRACT

An embodiment of the inventive concept provides a method of manufacturing a polymer film, the method including: preparing a first copolymer containing a first functional group; preparing a second copolymer containing a second functional group; preparing a first compound containing a third functional group; and performing a cross-linking reaction by mixing the first copolymer, the second copolymer, and the first compound, wherein the cross-linking reaction includes a reaction of the first functional group and the second functional group and a reaction of the second functional group and the third functional group, the first compound includes a polar group and any one group selected from among a vinyl group, an aryl group, and an acrylate group, and the third functional group has reactivity with respect to the second functional group, but does not have reactivity with respect to the first functional group.

17 Claims, 6 Drawing Sheets

METHOD OF MANUFACTURING POLYMER FILM AND POLYMER FILM COMPOSITION

CROSS-REFERENCE TO RELATED APPLICATION

This U.S. non-provisional patent application claims priority under 35 U.S.C. § 119 of Korean Patent Application No. 10-2019-0176236, filed on Dec. 27, 2019, the entire contents of which are hereby incorporated by reference.

BACKGROUND

The present disclosure herein relates to a method of manufacturing a polymer film and a polymer film composition.

There is a rising interest on an electro-active film which can convert electrical energy into mechanical motion. However, in general, the electro-active film needs a high operation voltage for operation, which is not safe, and thus needs a film which can be operated even at a low voltage. Many studies on a method of manufacturing a film with materials having a high dielectric constant and a low initial modulus to be effectively deformed at a low operation voltage.

SUMMARY

The present disclosure provides a method of manufacturing a transparent polymer film having a high dielectric constant and a low initial modulus, and a polymer film composition.

The purpose of the present disclosure is not limited to the aforesaid, but other purposes not described herein will be clearly understood by those skilled in the art from descriptions below.

The present disclosure herein relates to a method of manufacturing a polymer film and a composition for a polymer film. An embodiment of the inventive concept provides a method of manufacturing a polymer film, the method including: preparing a first copolymer containing a first functional group; preparing a second copolymer containing a second functional group; preparing a first compound containing a third functional group; and performing a cross-linking reaction by mixing the first copolymer, the second copolymer, and the first compound, wherein the cross-linking reaction includes a reaction of the first functional group and the second functional group and a reaction of the second functional group and the third functional group, the first compound includes a polar group and any one group selected from among a vinyl group, an aryl group, and an acrylate group, and the third functional group has reactivity with respect to the second functional group, but does not have reactivity with respect to the first functional group.

In an embodiment, the first compound may include one selected from among tri(ethylene glycol)divinyl ether, ethylene glycol diacrylate, di(ethylene glycol)diacrylate, tri(ethylene glycol)diacrylate, tetra(ethylene glycol)diacrylate, acrylonitrile, acrylic acid, vinyl acetate, ethyl vinyl ether, ethylene glycol vinyl ether, 1,4-butanediol vinyl ether, sodium acrylate, sodium allylsulfonate, vinyl acetic acid, 4-vinylbenzenesulfonate, and 2-methyl-2-propene-1-sulfonic acid sodium salt.

In an embodiment, the first functional group and the third functional group each may be a vinyl group, and the second functional group may be a hydridosilyl group.

In an embodiment, the cross-linking reaction may include a hydrosilylation reaction.

In an embodiment, the first copolymer and the second copolymer each may contain polysiloxane.

In an embodiment, the first copolymer may include a first polymer and a second polymer, wherein the first polymer may contain a polymerizing unit represented by Formula 1 below:

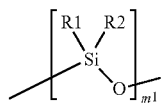

[Formula 1]

In Formula 1, R1 may be represented by Formula 2 below, R2 may be halogen, a linear or branched alkyl group having 1 to 5 carbon atoms, or a substituted or unsubstituted phenyl group having 6 to 13 carbon atoms, and m1 may be an integer of 1 to 500.

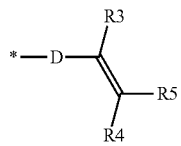

[Formula 2]

In Formula 2, * may be a part connected to Si in Formula 1, D may be a single bond, a linear or branched alkyl group having 1 to 5 carbon atoms, a carbonyl group, an ester group, an acetate group, an amide group, or —S—CO, and R3, R4, and R5 may be each independently hydrogen, halogen, or a linear or branched alkyl group having 1 to 5 carbon atoms.

In an embodiment, the second polymer may contain a polymerizing unit represented by Formula 3 below:

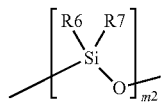

[Formula 3]

In Formula 3, R6 and R7 may be each independently halogen, a linear or branched alkyl group having 1 to 5 carbon atoms, or a substituted or unsubstituted phenyl group having 6 to 13 carbon atoms, and m2 may be an integer of 100 to 4,000.

In an embodiment, the first functional group may be the same as the third functional group.

In an embodiment, performing the cross-linking reaction by mixing the first copolymer, the second copolymer, and the first compound may include: producing a polymer film composition by mixing the first copolymer, the second copolymer, and the first compound; forming the polymer film composition to form a polymer liquid layer; and performing a heat treatment process to the polymer liquid layer to bond the first copolymer to the second copolymer and to bond the second copolymer to the first compound.

In an embodiment, the second copolymer may include a third polymer and a fourth polymer, wherein the third polymer may contain a polymerizing unit represented by Formula 5 below:

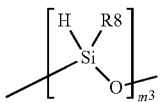
[Formula 5]

In Formula 5, R8 may be hydrogen, halogen, a linear or branched alkyl group having 1 to 5 carbon atoms, or a substituted or unsubstituted phenyl group having 6 to 13 carbon atoms, and m3 may be an integer of 1 to 1,000.

In an embodiment, the first copolymer may include a first polymer and a second polymer, and the fourth polymer may be the same as the second polymer.

An embodiment of the inventive concept provides a polymer film composition including: a first copolymer including a first polymer derived from a first monomer and a second polymer derived from a second monomer; a second copolymer including the second polymer and a third polymer derived from a third monomer; and a first compound, wherein the first compound includes a polar group and any one group selected from among a vinyl group, an aryl group, and an acrylate group, and the first copolymer and the second copolymer include a polydimethylsiloxane (PDMS)-based polymer.

In an embodiment, the first polymer may contain a first functional group, the third polymer may contain a second functional group having reactivity with respect to the first functional group, and the first compound may contain a third functional group having reactivity with respect to the second functional group, wherein the third functional group may not have reactivity with respect to the first functional group.

In an embodiment, the first functional group and the third functional group may be a vinyl group, and the second functional group may be a hydridosilyl group.

In an embodiment, the first compound may include one selected from among tri(ethylene glycol)divinyl ether, ethylene glycol diacrylate, di(ethylene glycol)diacrylate, tri(ethylene glycol)diacrylate, tetra(ethylene glycol)diacrylate, acrylonitrile, acrylic acid, vinyl acetate, ethyl vinyl ether, ethylene glycol vinyl ether, 1,4-butanediol vinyl ether, sodium acrylate, sodium allylsulfonate, vinyl acetic acid, 4-vinylbenzenesulfonate, and 2-methyl-2-propene-1-sulfonic acid sodium salt.

In an embodiment, the first polymer may contain a polymerizing unit represented by Formula 1 below:

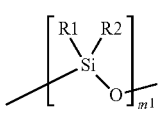
[Formula 1]

In Formula 1, R1 may be represented by Formula 2 below, R2 may be halogen, a linear or branched alkyl group having 1 to 5 carbon atoms, or a substituted or unsubstituted phenyl group having 6 to 13 carbon atoms, and m1 may be an integer of 1 to 500.

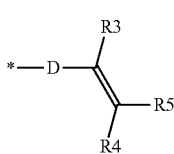
[Formula 2]

In Formula 2, * may be a part connected to Si in Formula 1, D may be a single bond, a linear or branched alkyl group having 1 to 5 carbon atoms, a carbonyl group, an ester group, an acetate group, an amide group, or —S—CO, and R3, R4, and R5 may be each independently hydrogen, halogen, or a linear or branched alkyl group having 1 to 5 carbon atoms.

In an embodiment, the second polymer may contain a polymerizing unit represented by Formula 3 below:

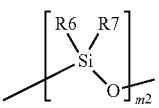
[Formula 3]

In Formula 3, R6 and R7 may be each independently halogen, a linear or branched alkyl group having 1 to 5 carbon atoms, or a substituted or unsubstituted phenyl group having 6 to 13 carbon atoms, and m2 may be an integer of 100 to 4,000.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
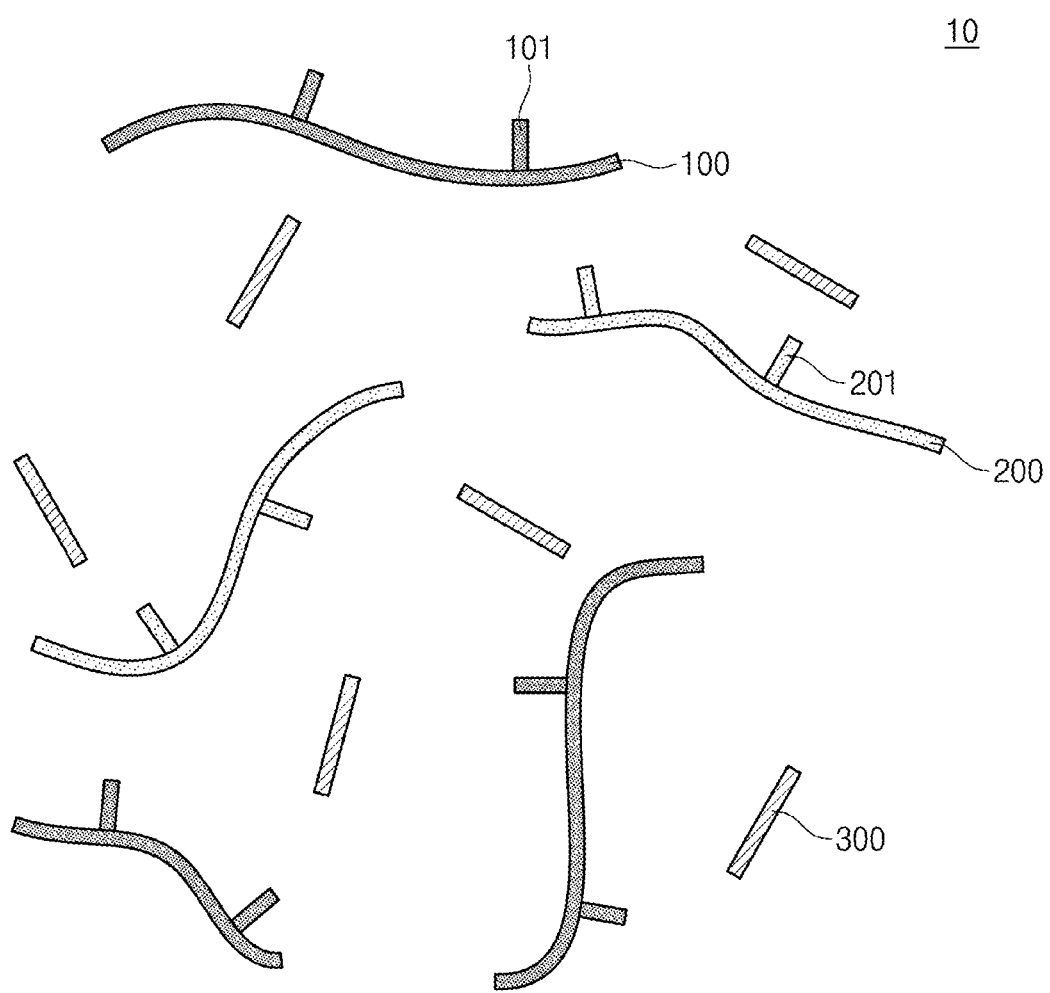
FIG. 1 is a schematic view illustrating a polymer film composition according to embodiments of the inventive concept.

Preferred embodiments of the inventive concept will be described with reference to the accompanying drawings so as to sufficiently understand constitutions and effects of embodiments of the inventive concept. The present invention may, however, be embodied in different forms and should not be construed as limited to the embodiments set forth herein. Rather, these embodiments are provided so that this disclosure will be thorough and complete, and will fully convey the scope of the present disclosure to those skilled in the art. A person with ordinary skill in the art to which the present disclosure pertains will understand that the inventive concept can be carried out under any appropriate condition.

The terms are used only for explaining embodiments while not limiting of the present disclosure. In this specification, the singular forms are intended to include the plural forms as well, unless the context clearly indicates otherwise. It will be understood that the terms 'comprises' and/or 'comprising', when used in this specification, specify the presence of stated components, steps, operations and/or elements, but do not exclude the presence or addition of one or more other components, steps, operations and/or elements.

It will be understood that when a film (or layer) is referred to as being 'on' another film (or layer) or substrate, it can be directly on the another film (or layer) or substrate, or intervening films (or layers) may also be present therebetween.

It will be understood that, although the terms first, second, third, etc. may be used herein to describe various regions, films (or layers), these regions and films should not be limited by these terms. These terms are used only to distinguish a predetermined region or film (or layer) from another region or film (or layer). Therefore, a layer referred to as a first layer in one embodiment can be referred to as a second layer in another embodiment. Each embodiment described and exemplified herein also includes a complementary embodiment thereof. Like reference numerals refer to like elements throughout.

Unless otherwise defined, all terms used in embodiments of the inventive concept have the same meaning as commonly understood by one of ordinary skill in the art to which the present disclosure belongs.

A polymer film composition according to the inventive concept will be described.

FIG. 1 is a schematic view illustrating a polymer film composition according to embodiments of the inventive concept.

Referring to FIG. 1, a polymer film composition 10 may include a first copolymer 100, a second copolymer 200, and a first compound 300.

The first copolymer 100 may include a first polymer and a second polymer. The first copolymer 100 may have a weight average molecular weight of 10,000 to 400,000. The first polymer may contain a polymerizing unit derived from a first monomer. For example, the first monomer may be diethoxymethylvinylsilane. The first polymer may contain a polymerizing unit represented by Formula 1 below:

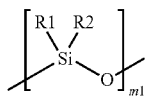

[Formula 1]

In Formula 1, R1 may be represented by Formula 2 below. R2 may be halogen, a linear or branched alkyl group having 1 to 5 carbon atoms, or a substituted or unsubstituted phenyl group having 6 to 13 carbon atoms, and $m_1$ may be an integer of 1 to 500.

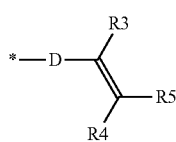

[Formula 2]

In Formula 2, * may be a part connected to Si in Formula 1. D may be a single bond, a linear or branched alkyl group having 1 to 5 carbon atoms, a carbonyl group, an ester group, an acetate group, an amide group, or —S—CO, and R3, R4, and R5 may be each independently hydrogen, halogen, or a linear or branched alkyl group having 1 to 5 carbon atoms.

The first polymer may contain a first functional group 101. The first functional group 101 may be a group represented by Formula 2 above. The first functional group may react with a second functional group 201 of the second copolymer 200, which will be described below. In an embodiment, the first functional group 101 may be the same as a third functional group (not shown) of the first compound 300, which will be described below. In another embodiment, the first functional group 101 may be different from the third functional group of the first compound 300.

The second polymer may be bonded to the first polymer. The second polymer may contain a polymerizing unit represented by Formula 3 below. The second polymer may be derived from a second monomer. The second monomer may be different from the first monomer. The second monomer may be, for example, diethoxydimethylsilane.

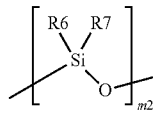

[Formula 3]

In Formula 3, R6 and R7 may be each independently halogen, a linear or branched alkyl group having 1 to 5 carbon atoms, or a substituted or unsubstituted phenyl group having 6 to 13 carbon atoms, and m2 may be an integer of 100 to 4,000.

According to an embodiment, the first copolymer 100 may be produced by a polymerization reaction of the first monomer and the second monomer. The first copolymer 100 produced by the polymerization reaction may be represented by Formula 4 below:

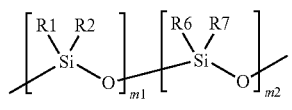

[Formula 4]

In Formula 4, R2, R6 and R7 may be each independently halogen, a linear or branched alkyl group having 1 to 5 carbon atoms, or a substituted or unsubstituted phenyl group having 6 to 13 carbon atoms, and m1 may be an integer of 1 to 500, m2 may be an integer of 100 to 4,000, and m1:m2 may be 10:90 to 0.1:99.9. R1 may be represented by Formula 2 above.

The second copolymer 200 may include a third polymer and a fourth polymer. The second copolymer 200 may have a weight average molecular weight of 200 to 200,000. The fourth polymer of the second copolymer 200 may be the same as the second polymer of the first copolymer 100 as described above. The fourth polymer may contain a polymerizing unit derived from a fourth monomer. The fourth monomer may be the same as the second monomer. The third polymer may contain a polymerizing unit derived from a third monomer. The third monomer may be different from the first monomer and the second monomer. The third monomer may include, for example, diethoxymethylsiloxane. The third polymer may contain a polymerizing unit represented by Formula 5 below:

[Formula 5]

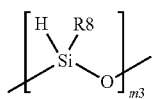

In Formula 5, R8 may be hydrogen, halogen, a linear or branched alkyl group having 1 to 5 carbon atoms, or a substituted or unsubstituted phenyl group having 6 to 13 carbon atoms, and m3 may be an integer of 1 to 1000.

The third polymer may contain a second functional group 201. The third polymer may contain a hydridosilyl group. For example, the second functional group 201 may be hydrogen H. The second functional group may react with the first functional group 101 of the first copolymer 100 or a third functional group (not shown) of the first compound 300.

The third polymer may be bonded to the fourth polymer. The fourth polymer may be substantially the same as the second polymer. The fourth polymer may contain a polymerizing unit represented by Formula 6 below:

[Formula 6]

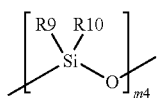

In Formula 6, R9 and R10 may be each independently halogen, a linear or branched alkyl group having 1 to 5 carbon atoms, or a substituted or unsubstituted phenyl group having 6 to 13 carbon atoms, and m4 may be an integer of 1 to 1,000.

According to an embodiment, the second copolymer 200 may be produced by a polymerization reaction of the third monomer and the fourth monomer. The second copolymer 200 produced by the polymerization reaction may be represented by Formula 7 below:

[Formula 7]

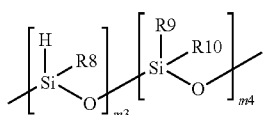

In Formula 7, R8 may be hydrogen, halogen, a linear or branched alkyl group having 1 to 5 carbon atoms, or a substituted or unsubstituted phenyl group having 6 to 13 carbon atoms, R9 and R10 may be each independently halogen, a linear or branched alkyl group having 1 to 5 carbon atoms, or a substituted or unsubstituted phenyl group having 6 to 13 carbon atoms, and m3 may be an integer of 1 to 1,000, m4 may be an integer of 1 to 1,000, and m3:m4 may be 99:1 to 1:99.

The first compound 300 may contain a third functional group (not shown). For example, the first compound 300 may include at least one from among a vinyl group, an aryl group, and an acrylate group. The first compound 300 may include a polar group. For example, the first compound may include one selected from among tri(ethylene glycol)divinyl ether, ethylene glycol diacrylate, di(ethylene glycol)diacrylate, tri(ethylene glycol)diacrylate, tetra(ethylene glycol) diacrylate, acrylonitrile, acrylic acid, vinyl acetate, ethyl vinyl ether, ethylene glycol vinyl ether, 1,4-butanediol vinyl ether, sodium acrylate, sodium allylsulfonate, vinyl acetic acid, 4-vinylbenzenesulfonate, and 2-methyl-2-propene-1-sulfonic acid sodium salt.

According to an embodiment, the first compound 300 may contain tri(ethylene glycol)divinyl ether, the first copolymer 100 may include a silicone copolymer represented by Formula 8 below, and the silicone copolymer may have a weight average molecular weight of about 10,000 to about 400,000. In Formula 8, the ratio of m1 to m2 is 10:90 to 0.1:99.9. The second copolymer 200 may include a silicone copolymer represented by Formula 9 below, and the silicone copolymer may have a weight average molecular weight of 200 to 200,000. In Formula 9, the ratio of m3 to m4 is 99:1 to 1:99.

[Formula 8]

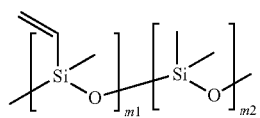

[Formula 9]

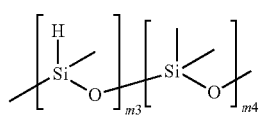

The first copolymer 100 and the first compound 300 each may contain a vinyl group. A total molar ratio of the vinyl group contained in the first copolymer 100 with respect to a total molar ratio of the hydridosilyl group contained in the second copolymer 200 may be 10 to 0.01. A total molar ratio of the vinyl group contained in the first compound 300 with respect to a total molar ratio of the hydridosilyl group contained in the second copolymer 200 may be 10 to 0.1.

Hereinafter, a method of manufacturing a polymer film using the polymer film composition 10 and a polymer film will be described below.

Figure 2:
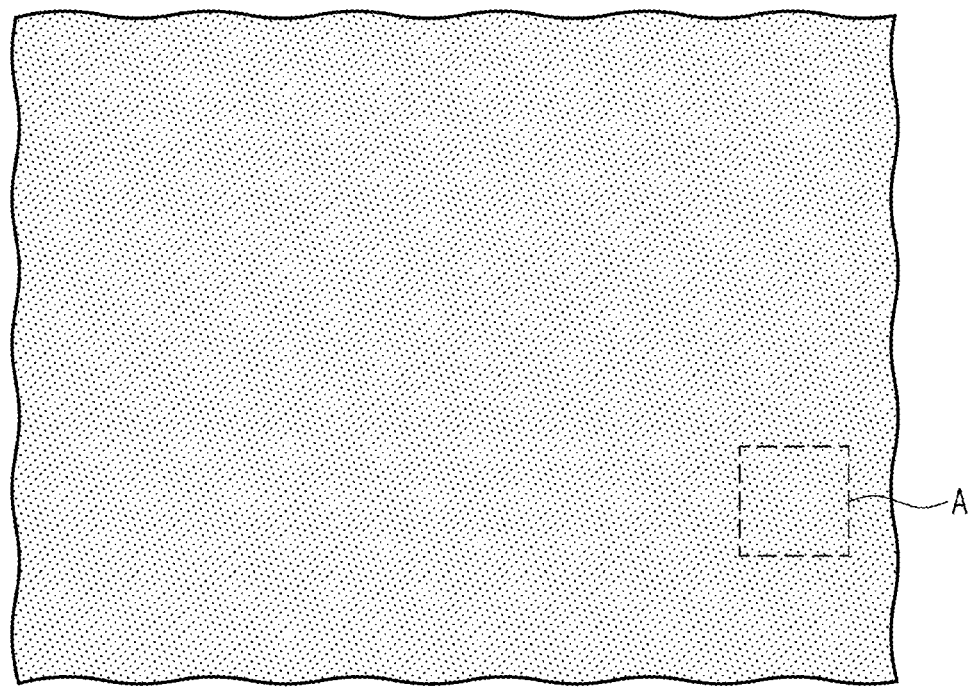
FIG. 2 is a plan view illustrating a polymer film according to embodiments of the inventive concept.
Figure 3:
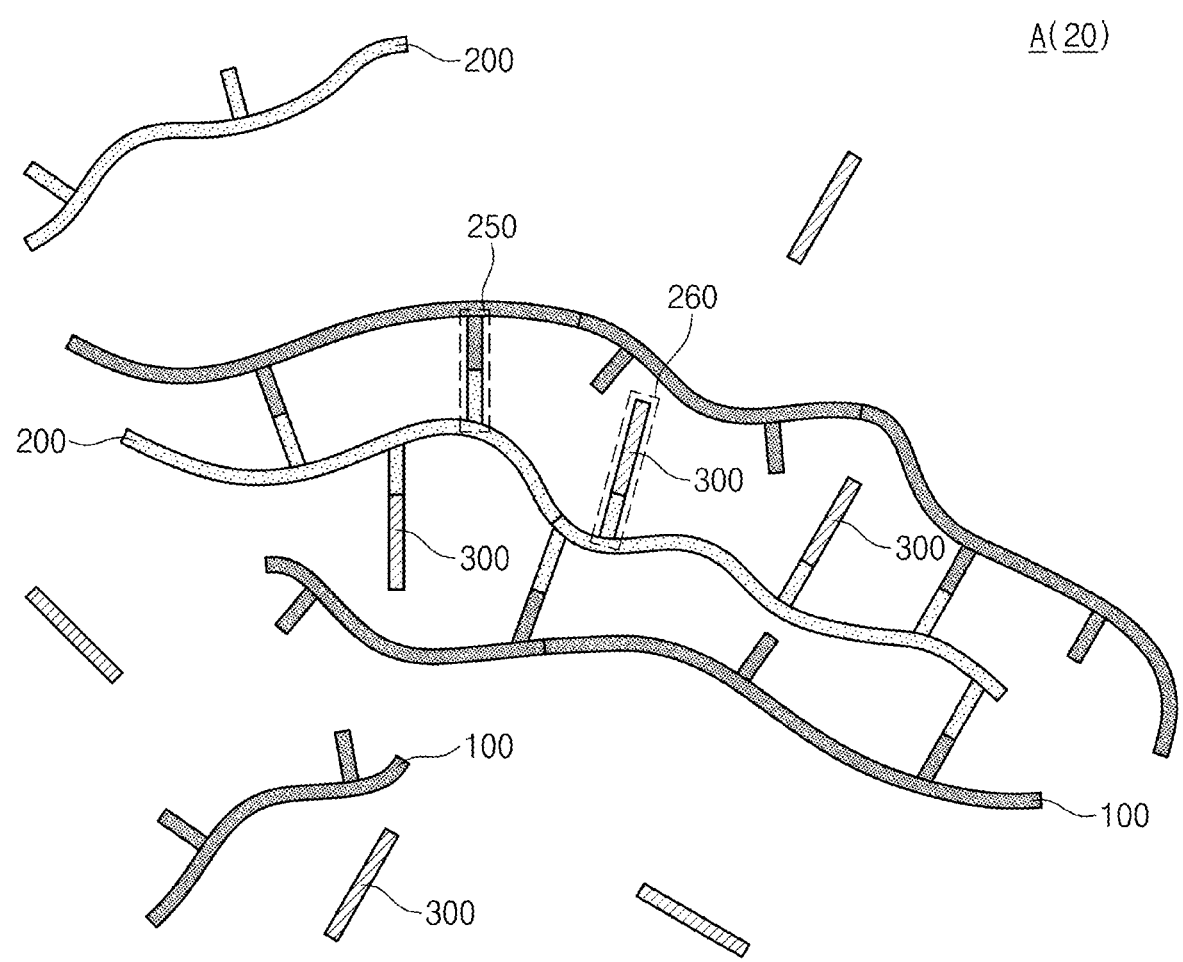
FIG. 3 is a schematic view illustrating materials of the polymer film of FIG. 2.
Figure 4:
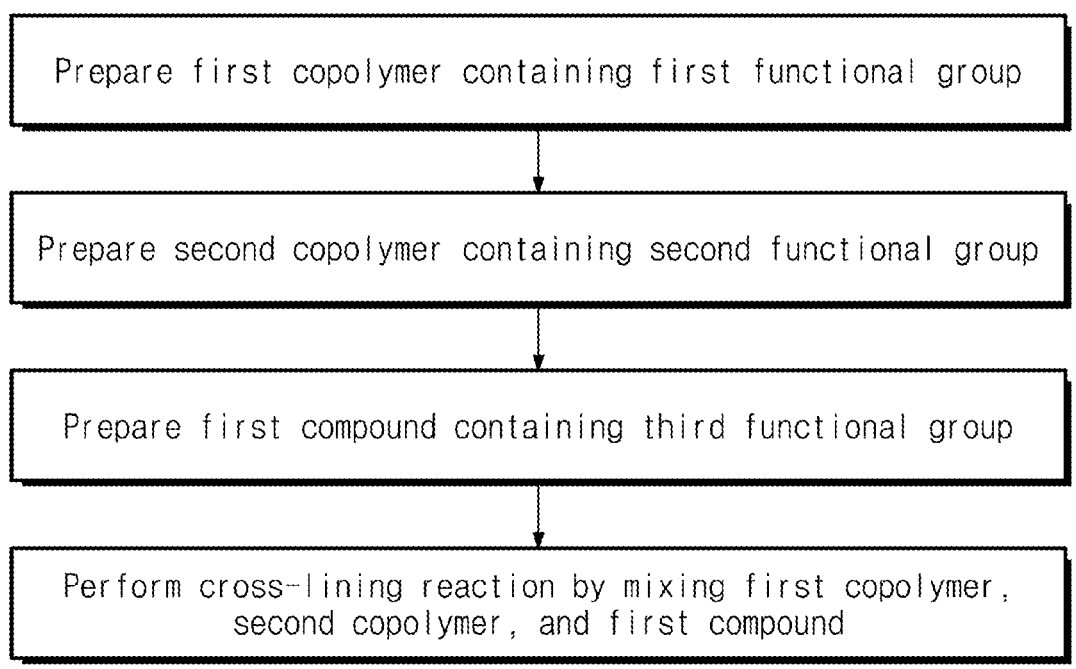
FIG. 4 is a flowchart for explaining a method of manufacturing a polymer film.

FIG. 2 is a plan view illustrating a polymer film according to embodiments of the inventive concept; FIG. 3 is a schematic view illustrating materials of the polymer film of FIG. 2; FIG. 4 is a flowchart for explaining a method of manufacturing a polymer film. The description in the duplicated region as described above will be omitted below.

Referring to FIGS. 1 and 4, the method of manufacturing a polymer film according to embodiments of the inventive concept may include: a step (S1) of preparing a first copolymer containing a first functional group; a step (S2) of preparing a second copolymer containing a second functional group; a step (S3) of preparing a first compound containing a third functional group; and a step (S4) of performing a cross-linking reaction by mixing the first copolymer, the second copolymer, and the first compound.

In the step (S1) of preparing the first copolymer containing the first functional group, the first copolymer 100 may be prepared. The first copolymer 100 may be prepared in a copolymer form of the first polymer and the second polymer by polymerizing the first monomer and the second monomer. The first polymer may be represented by Formula 1 above, and the second polymer may be represented by Formula 3 above. In an embodiment, the first monomer may include diethoxymethylvinylsilane, and the second monomer may include diethoxydimethylsilane. The first copolymer may be produced by adding, to a flask, a predetermined amount of the first monomer and the second monomer as Reaction Formula 1. More specifically, after mixing the first monomer and the second monomer, the first monomer and the second monomer may be subjected to a copolymerization reaction by feeding a reaction catalyst. The reaction catalyst may include, for example, distilled water and a hydrochloric acid aqueous solution. After the copolymerization reaction, diluent may be fed into the flask. For example, the diluent may include ethyl acetate (hereinafter, EA). The diluent may be removed again from a solution (hereinafter, a first EA copolymer solution) in which the first copolymer is diluted with EA. For example, the removal of the diluent may include pouring the first EA copolymer solution in distilled water, and separating the first EA copolymer solution and distilled water in layers using a separatory funnel. After separating the first EA copolymer solution, water may be removed from the first EA copolymer solution. More specifically, water may be removed using magnesium sulfate. After water is removed, the first EA copolymer solution may be provided in a vacuum decompressed state. In the vacuum decompressed state, ethyl acetate in the first EA copolymer solution may be removed. Accordingly, the first copolymer 100 may be produced. The first copolymer 100 may be represented by Formula 4 above.

The step (S2) of preparing the second copolymer containing the second functional group may include polymerizing the third monomer and the fourth monomer. The third polymer may be represented by Formula 5 above, and the fourth polymer may be represented by Formula 6 above. In an embodiment, the fourth monomer may include diethoxydimethylsilane, and the third monomer may include diethoxymethylsilane. The production of the second copolymer 200 may be performed in the same manner as the production of the first copolymer 100. However, the third monomer and the fourth monomer may be used as a starting material. The second copolymer 200 may be represented by Formula 7 above.

Referring to FIGS. 1 to 3, the step (S3) of preparing the first compound containing the third functional group, and the step (S4) of performing the cross-linking reaction by mixing the first copolymer, the second copolymer, and the first compound may be performed. In an embodiment, the first compound may be tri(ethylene glycol)divinyl ether. The second functional group may have reactivity with the first functional group. The third functional group may have reactivity with the second functional group, but may not have reactivity with the first functional group. The first copolymer 100, the second copolymer 200, and the first compound 300 may be mixed to produce a polymer film composition 10. The polymer film composition 10 may be formed in a thin film to form a polymer liquid layer. For example, the polymer film composition may be applied thinly on the upper surface of a base film or a glass substrate to form the polymer liquid layer. The heat treatment process may be performed to the polymer liquid layer. The first copolymer 100, the second copolymer 200, and the first compound 300 in the polymer liquid layer may be bonded to each other through the heat treatment to form a polymer film 20. More specifically, the cross-linking reaction between the first copolymer 100 and the second copolymer 200, and the reaction between the second copolymer 200 and the first compound 300 in the polymer liquid layer may occur through the heat treatment. The cross-linking reaction may include a hydrosilylation. By the hydrosilylation, the polymer liquid layer may be cured to form the polymer film 20. In an embodiment, the first functional group 101 of the first copolymer 100 and the second functional group 201 of the second copolymer 200 may be bonded to each other to form a first section 250. The first functional group 101 may be a vinyl group, and the second functional group 201 may be a hydridosilyl group. The first copolymer 100 and the second copolymer 200 may be bonded to each other through the first section 250 as Formula 10 below. The first section 250 may be represented by Formula 11 below:

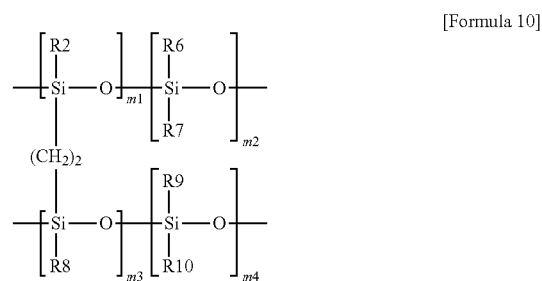
[Formula 10]

In Formula 10, R2, R6, R7, R8, R9, m1, m2, m3, and m4 are the same as defined in Formula 4 to Formula 6 above.

*—(CH$_2$)$_2$—#        [Formula 11]

In Formula 11, * may be a part bonded to Si of the first polymer, and # may be a part bonded to Si of the third polymer.

In another embodiment, the second functional group 201 of the second copolymer 200 and the third functional group (not shown) of the first compound may be reacted with each other to form a second section 260. The second functional group 201 may be a hydridosilyl group, and the third functional group may be a vinyl group. The second copolymer 200 and the first compound 300 may be bonded to each other through the second section 260 as Formula 12 below. The second section 260 may be represented by Formula 14 below:

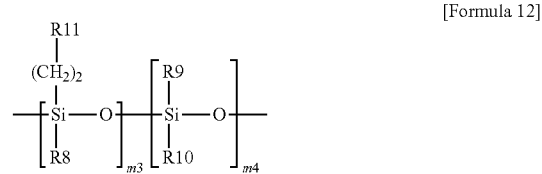
[Formula 12]

In Formula 12, R8, R9, R10, m3, and m4 are the same as defined in Formula 7 above. R11 may include an amine and a salt thereof, an ester, a carboxylic acid and a salt thereof, a sulfonic acid and a salt thereof, and glycol.

For example, R11 may be represented by Formula 13 below:

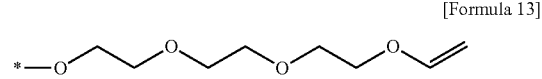 [SMILES: *OCCOCCOCCOC=C]
[Formula 13]

In Formula 13, * may be a part bonded to (CH$_2$)$_2$ in Formula 12 above.

*—(CH$_2$)$_2$—R11        [Formula 14]

In Formula 14, * may be a part bonded to Si of the second copolymer 200.

The first functional group 101 of the first copolymer 100 and the third functional group of the first compound 300 may be competitively bonded to the second functional group 201 of the second copolymer 200. Accordingly, the second functional group 201 may be bonded to any one among the first functional group 101 and the third functional group.

The polymer film 20 according to an embodiment of the inventive concept may be manufactured by the manufacturing method as described above. The polymer film 20 may be represented by Formula 15 below:

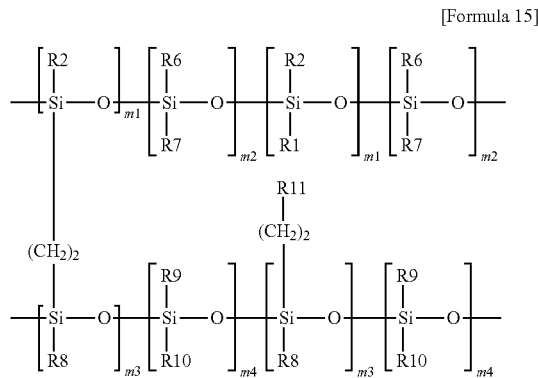

[Formula 15]

In general, an electro-active film is manufactured by using a polymer which is soft and has excellent elongation. In particular, a polysiloxane-based polymer has 143° of an angle of O—Si—O in a main chain, which is large, and thus the functional group bonded to Si moves freely, and the polysiloxane-based polymer may be more flexible than a polymer having a main chain composed of carbons (C). Therefore, when a film is manufactured by using the polysiloxane-based polymer, the film may have a low initial modulus and be transparent. Accordingly, the polysiloxane-based polymer, in particular, polydimethylsiloxane (hereinafter, PDMS) is widely used as a material of an electro-active film. When electrodes are formed on the top and bottom surfaces of the electro-active film and an electric field is applied thereon, Maxwell pressure (P) represented by Equation 1 below is generated between both electrodes, and the deformation amount (S) of the thickness of the electro-active film according to the Maxwell pressure (P) may be represented by Equation 2 below:

$$P = \varepsilon \varepsilon_0 (V/t)^2$$ [Equation 1]

In Equation 1 above, E is a dielectric constant for free space, $\varepsilon_0$ is a dielectric constant for the film, V is an applied voltage, and t is a thickness of the film.

$$S = -\varepsilon \varepsilon_0 V^2 / E$$ [Equation 2]

In Equation 2 above, $\varepsilon$, $\varepsilon_0$, and V are the same as defined in Equation 1, and E is an elastic coefficient of the film.

Therefore, as a dielectric constant is increased and initial modulus is reduced, the electro-active film may show a high deformation rate even in a weak electric field. The polymer film according to an embodiment of the inventive concept contains a third compound containing a polar group to increase the dielectric constant for the film. Since the third compound is chemically bonded to a main chain of the second copolymer 200 in the polymer film, transparency of the polymer film is not deteriorated, and the third compound is mixed with the first copolymer 100 and the second copolymer 200 in the producing of the polymer film composition, so that a polymer film may be manufactured in a relatively simple process.

Figure 5A:
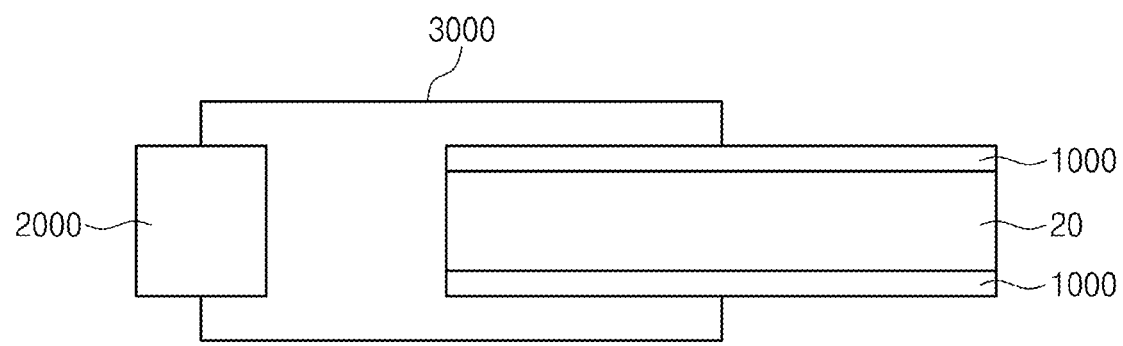
FIGS. 5A and 5B are views for explaining electro-active characteristics of a polymer film according to embodiments.
Figure 5B:
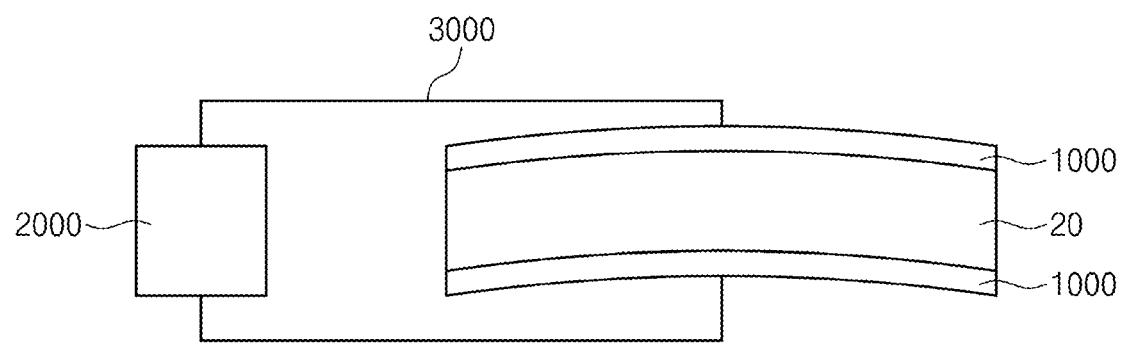

FIGS. 5A and 5B are views for explaining electro-active characteristics of a polymer film according to embodiments.

Referring to FIG. 5A, a pair of electrodes 1000 may be provided on the top surface and the bottom surface of the polymer film 20. The pair of electrodes 1000 may be connected to an external power source 2000 through an electric wire 3000. A separate electric field may not be applied to the polymer film 20. In this case, the polymer film 20 may be maintained in the first shape and transparent. For example, transmittance in a visible light region may be 70-90%.

Referring to FIG. 5B, an electric field may be applied to the polymer film 20. More specifically, the external power source 2000 may apply different voltages to each of the pair of electrodes 1000. Accordingly, an electric field may be applied to the polymer film 20. When the electric field is applied to the polymer film 20, the Maxwell pressure as described above may be applied to the polymer film 20. By the pressure, the polymer film 20 may be extended or bent in a direction. Accordingly, the polymer film 20 may serve as an electric-active film.

Hereinafter, the production of the composition and the film will be described with reference to Experimental Examples of the inventive concept.

Production of Composition 1-1. Production of First Copolymer (VPDMS Experimental Example 1)

Diethoxydimethylsilane (75.01 g) and diethoxymethylvinylsilane (0.82 g) were added to a 250 mL three-neck flask, the mixture was stirred at a temperature condition of 10° C. or less at 250 rpm, and a nitrogen gas current was passed therethrough. As a reaction catalyst, 7.9 mL of distilled water and 2.0 mL of 37% hydrochloric acid aqueous solution were slowly added, followed by raising the temperature to 70° C. The flask was subjected to a polymerization reaction for about 24 hours under the nitrogen gas current at 70 mL/min.

A polymer reactant was formed in the flask. The polymer reactant was diluted by adding 200 mL of ethyl acetate (EA) to the flask (hereinafter, an EA copolymer solution). Then, the EA copolymer solution was poured into 700 mL of distilled water, the EA copolymer solution and water were separated in layers for one day using a separatory funnel. After separating the EA copolymer solution, water was removed from the EA copolymer solution using magnesium sulfate. Ethyl acetate (EA) was removed from the EA polymer reactant at room temperature under a vacuum decompression to obtain a colorless and transparent polymer reactant. The polymer reactant showed a high viscosity liquid state. The polymer reactant was dried in a vacuum dryer at 35° C. for two days to obtain Experimental Example 1.

Confirmation of Production of VPDMS
Experimental Example 1
(Poly(dimethylsiloxane-co-methylvinylsiloxane))

The yield of VPDMS Experimental Example 1, a gel permeation chromatography (hereinafter, GPC), a Fourier Transform Infrared spectroscopy (hereinafter, IR), and Proton nuclear magnetic resonance spectroscopy (hereinafter, $^1$H-NMR) were performed.

The GPC was performed by flowing a tetrahydrofuran solvent at a rate of 0.6 mL/min using Waters 2690 Alliance gel permeation chromatograph apparatus mounted with a refractive index detector. IR was performed using Nicolet 6700 FT-IR spectrometer. $^1$H-NMR was performed by using Bruker 500 MHz NMR spectrometer and deuterated chloroform (CDCl$_3$) was used as a solvent.

Yield: 33.8 g (89%);

GPC (THF, polystyrene standard): $M_n$=100,741; $M_w$=165,425; PD=1.64.

IR $V_{max}$ (Liquid, NaCl)/cm$^{-1}$: 3053 w (=C—H str., vinyl); 2963 s, 2905 m (C—H str., methyl); 1598 s (C=C str., vinyl); 1411 m (C—H ben., methyl); 1097 s, 1019 s (Si—O—Si str., siloxane). $^1$H NMR $\delta_h$ (CDCl$_3$, 500 MHz): 5.92-6.05 (2H, m, vinyl); 5.78-5.83 (H, m, vinyl); 0.04-0.20 (9H, m, methyl). $^{13}$C NMR $\delta_c$ (CDCl$_3$, 500 MHz): 137.11 (s, —CH=); 132.77 (s, =CH$_2$); 0.76-1.35 (m, —CH$_3$).

GPC analysis was carried out in order to determine a molecular weight and a molecular weight distribution of the synthesized VPDMS Experimental Example 1. The number average molecular weight of Experimental Example 1 was determined to be about 10.0×10$^4$ g/mol, and the weight average molecular weight thereof was determined to be about 16.5×10$^4$ g/mol. Experimental Example 1 was analyzed to have a polydispersity index of 1.64.

$^1$H-NMR analysis of Experimental Example 1 was performed, and thus each peak at 0.1 ppm, 5.8 ppm, and 6.0 ppm was observed. The peak near 0.1 ppm corresponds to hydrogen of Si—CH$_3$, the peak near 5.8 ppm to CH hydrogen of —CH=CH$_2$, and the peak near 5.9-6.0 ppm to CH$_2$ hydrogen of —CH=CH$_2$. When hydrogen in each environment was quantified by considering each area ratio, each ratio of a polymerizing unit (m2 in Formula 7) containing dimethylsiloxane and a polymerizing unit (m1 in Formula 7) containing methylvinylsiloxane in Experimental Example 1 was calculated to be about 0.99 and about 0.01. Thus, the mole ratio of the polymerizing units of the first copolymer in Experimental Example 1 was analyzed to be the same as the feeding mole ratio of the monomers. From such results, it was confirmed that Experimental Example 1 contained poly(dimethylsiloxane-co-methylvinylsiloxane).

1-2. Production of Second Copolymer (HPDMS Experimental Example 2)

The second copolymer was produced in the same manner as in VPDMS Experimental Example 1 above. However, diethoxydimethylsilane (49.98 g) and diethoxymethylsilane (5.02 g) were used as the starting material. As a catalyst for polymerization, 5.8 mL of distilled water and 1.5 mL of 37% hydrochloric acid aqueous solution were added.

Confirmation of Production of HPDMS Experimental Example 2 (Poly(dimethylsiloxane-co-methylsiloxane))

The production of HPDMS Experimental Example 2, a GPC analysis, IR, and $^1$H-NMR were performed in the same manner as in Experimental Example 1.

Yield: 23.76 g (87%)

GPC (THF, polystyrene standard): $M_n$=16,814; $M_w$=97,048; PD=5.77

IR $V_{max}$ (Liquid, NaCl)/cm$^{-1}$: 2963 s, 2905 m (C—H str., methyl); 2156 m (Si—H str., hydridosilyl); 1412 m (C—H ben., methyl); 1097 s, 1023 s (Si—O—Si str., siloxane). $^1$H NMR $\delta_h$ (CDCl$_3$, 500 MHz): 4.71 (s, Si—H); 0.09-0.16 (m, —CH$_3$). $^{13}$C NMR $\delta_c$ (CDCl$_3$, 500 MHz): 0.62-1.37 (m, —CH$_3$).

GPC analysis of Experimental Example 2 was carried out, and thus the number average molecular weight of HPDMS Experimental Example 2 was determined to be about 16.8×10$^3$ g/mol, the weight average molecular weight thereof was determined to be about 97.0×10$^3$ g/mol, and the polydispersity index thereof was determined to be about 5.77.

$^1$H-NMR analysis of Experimental Example 2 was performed, and thus each peak near 0.1 ppm and 4.7 ppm was observed. The peak near 0.1 ppm corresponds to hydrogen of Si—CH$_3$ and the peak near 4.7 ppm to Si—H.

From such results, it was confirmed that Experimental Example 2 contained poly(dimethylsiloxane-co-methylsiloxane). When considering each area ratio of the peaks, each ratio of a polymerizing unit (m4 in Formula 8) containing dimethylsiloxane and a polymerizing unit (m3 in Formula 8) containing methylsiloxane in Experimental Example 2 was calculated to be about 0.92 and 0.08. Thus, the mole ratio of the polymerizing units of the second copolymer in Experimental Example 2 was analyzed to be nearly identical to the feeding mole ratio of the monomers. The second copolymer having this copolymerizing ratio will be referred to as HPDMS10.

1-3. Production of Second Copolymer (HPDMS Experimental Example 3)

The first copolymer was produced in the same manner as in HPDMS Experimental Example 2 above. However, diethoxydimethylsilane (30.15 g) and diethoxymethylsilane (6.82 g) were used as the starting material. As a catalyst for polymerization, 3.6 mL of distilled water and 1.0 mL of 37% hydrochloric acid aqueous solution were added.

Confirmation of Production of HPDMS Experimental Example 3 (Poly(dimethylsiloxane-co-methylsiloxane))

The production of HPDMS Experimental Example 3, a GPC analysis, IR, and $^1$H-NMR were performed in the same manner as in Experimental Example 2.

Yield: 16.01 g (64%)

GPC (THF, polystyrene standard): $M_n$=16,414; $M_w$=38,480; PD=2.34

IR $V_{max}$ (Liquid, NaCl)/cm$^{-1}$: 2964 s, 2905 m (C—H str., methyl); 2159 m (Si—H str., hydridosilyl); 1412 m (C—H ben., methyl); 1096 s, 1031 s (Si—O—Si str., siloxane). $^1$H NMR $\delta_h$ (CDCl$_3$, 500 MHz): 4.70 (s, Si—H); 0.09-0.18 (m, Si—CH$_3$). $^{13}$C NMR $\delta_c$ (CDCl$_3$, 500 MHz): 0.76-1.33 (m, —CH$_3$).

GPC analysis of HPDMS Experimental Example 3 was carried out, and thus the number average molecular weight of HPDMS Experimental Example 3 was determined to be about 16.4×10$^3$ g/mol, the weight average molecular weight thereof was determined to be about 38.5×10$^3$ g/mol, and the polydispersity index thereof was determined to be about 2.34.

$^1$H-NMR analysis of Experimental Example 3 was performed, and thus each peak at 0.1 ppm and 4.7 ppm was observed. The peak near 0.1 ppm corresponds to hydrogen of Si—CH$_3$ and the peak near 4.7 ppm to Si—H.

From such results, it was confirmed that Experimental Example 3 contained poly(dimethylsiloxane-co-methylsiloxane). When considering each area ratio of the peaks, each ratio of a polymerizing unit (m4 in Formula 8) containing dimethylsiloxane and a polymerizing unit (m3 in Formula 8) containing methylsiloxane in Experimental Example 3 was calculated to be about 0.81 and 0.19. Thus, the mole ratio of the polymerizing units of the second copolymer in Experimental Example 3 was analyzed to be nearly identical to the feeding mole ratio of the monomers. The second copolymer having this copolymerizing ratio will be referred to as HPDMS20.

2. Production of Polymer Film Composition According to First Copolymer and Second Copolymer The first copolymer, the second copolymer, and tri(ethylene glycol)divinyl ether (the first compound; hereinafter, TEGDE), which were produced as described above, were mixed as Table 1 below to produce a composition.

TABLE 1

| Experimental Example | Mass of the first copolymer (g) | Mass of the first compound (g) | Mass of the second copolymer (g) |
|---|---|---|---|
| PDMS T1 | 1.3769 | 0 | 0.1589 (HPDMS10) |
| PDMS T2 | 1.4542 | 0.1685 | 0.1697 (HPDMS10) |
| PDMS T3 | 1.3554 | 0.1547 | 0.1509 (HPDMS20) |

3. Manufacture of Polymer Film

The prepared polymer film composition was provided on the glass substrate. A polymer liquid layer was formed with Doctor-knife, and bubbles in the layer were removed at room temperature (25° C.) under a vacuum decompression. Then, the polymer liquid layer was provided in an oven to be heat-treated at 80° C. for 2 hours. When TEGDE was added, in order to remove the unreacted TEGDE, the mixture was dried for 1 hour under a vacuum decompression to obtain a polymer film. A thickness of the film was measured to be about 150 μm.

Experimental Example T1, Experimental Example T2, and Experimental Example T3 were the films fabricated from compositions of Experimental Example PDMS T1, Experimental Example PDMS T2, and Experimental Example PDMS T3, respectively.

Hereinafter, the description of FIGS. 6 and 7 will be described with reference to FIGS. 1 to 3 together.

Figure 6:
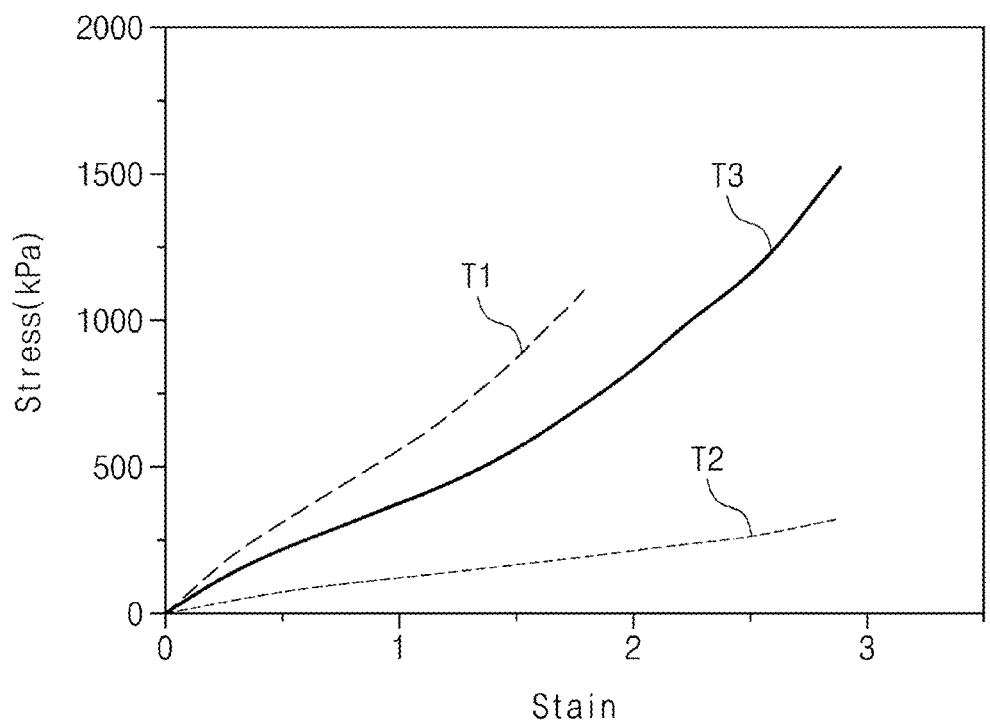
FIG. 6 is a graph showing stress-strain curves of Experimental Example T1, Experimental Example T2, and Experimental Example T3.

FIG. 6 is a graph showing stress-strain curves of Experimental Example T1, Experimental Example T2, and Experimental Example T3. Table 2 shows analysis results of the initial modulus, the maximum tensile strength, and the maximum strain (%) of Experimental Example T1, Experimental Example T2, and Experimental Example T3.

TABLE 2

| Experimental Example | Initial modulus (kPa) | Maximum tensile strength (kPa) | Maximum strain (%) |
|---|---|---|---|
| T1 | 762 | 926 | 156 |
| T2 | 154 | 299 | 265 |
| T3 | 484 | 1438 | 277 |

Referring to FIG. 6 and Table 2 together, it is seen that as the first compound 300 is introduced to the polymer film 20, the initial modulus decreases, the maximum strain increases, and the maximum tensile strength decreases. (Experimental Examples T1 and T2) Accordingly, it is seen that the polymer film according to Experimental Examples of the inventive concept contained the first compound 300, thereby improving electro-active characteristics. In addition, it is confirmed that Experimental Example T3 has more amounts of the first compound 300 bonded to the second copolymer 200 in the polymer film 20 than that of Experimental Example T2, and thus the maximum strain of Experimental Example T3 is greater than that of Experimental Example T2. However, it is confirmed that Experimental Example T3 also has more number of bonds to the first copolymer 100 and the second copolymer 200 than that of Experimental Example T2, and thus the initial modulus of Experimental Example T3 is greater than that of Experimental Example T2. TEGDE participates in the reaction, and thus the initial modulus of the film is reduced to improve electro-active characteristics (see Equation 2).

Figure 7:
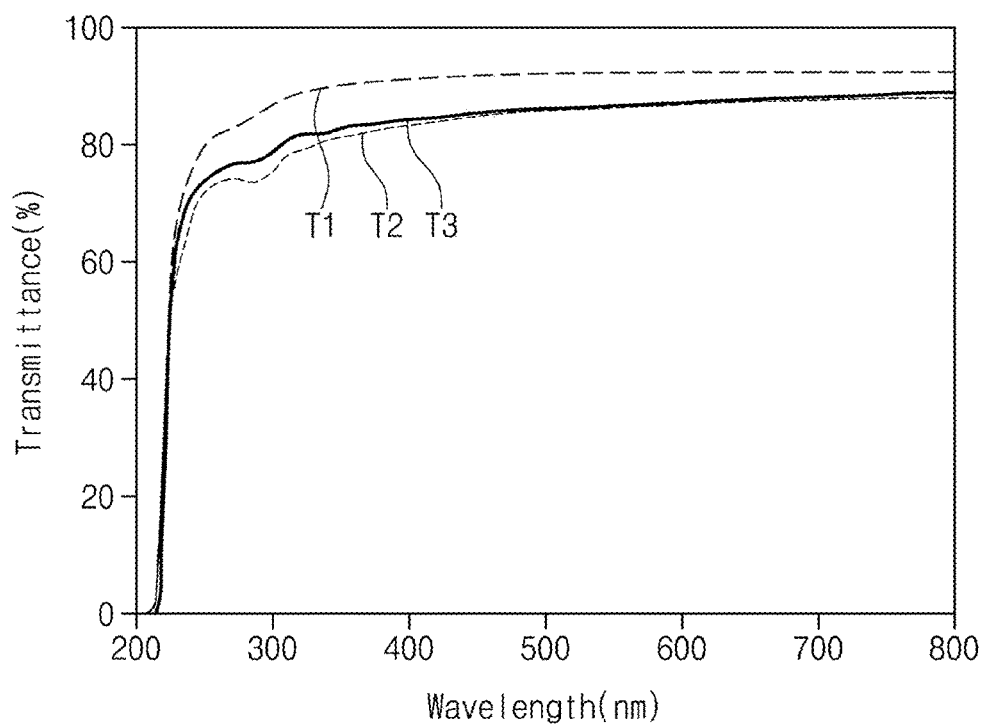
FIG. 7 is a graph showing light transmittance against wavelength of Experimental Example T1, Experimental Example T2, and Experimental Example T3.

FIG. 7 is a graph showing light transmittance against wavelength of Experimental Example T1, Experimental Example T2, and Experimental Example T3.

Referring to FIG. 7, it is confirmed that Experimental Example T1 shows a light transmissivity of 90-92% in a visible light region of 400-700 nm, and Experimental Examples T2 and T3 show a light transmissivity of 83-87% in a visible light region having the same wavelength range as Experimental Example T1. Accordingly, although the polymer film 20 according to the inventive concept includes the first compound 300, the polymer film 20 may have a relatively excellent light transmissivity value.

TABLE 3

| Experimental Example | Dielectric constant (pF/m) |
|---|---|
| T1 | 25 |
| T2 | 28 |
| T3 | 36 |

Referring to Table 3, it is confirmed that as the number of the first compounds 300 bonded to the second copolymer 200 increases, the dielectric constant of the polymer film 20 increases. This is because as the first compound 300 having a polar group increases, polarization phenomenon is enhanced. Accordingly, the polymer film 20 according to the inventive concept has improved dielectric constant compared to the case not containing the first compound 300 to have an advantage in electro-active characteristics (see Equation 2).

According to embodiments of the inventive concept, a polymer film composition may include a compound containing a polar group. Accordingly, a transparent polymer film having a low initial modulus and a high dielectric constant may be manufactured, and the polymer film may be manufactured more simply, as well.

The effects of the present disclosure are not limited to the aforesaid, but other effects that are not described herein will be clearly understood by those skilled in the art from descriptions below.

The above detailed description of the present disclosure does not intend to limit the present disclosure to the disclosed embodiments and can be used under various different combinations, changes, and conditions without departing from the subject matters of the present disclosure. The appended claims should be appreciated to include another embodiment.

What is claimed is:

1. A method of manufacturing a polymer film, the method comprising:
preparing a first copolymer containing a first functional group;
preparing a second copolymer containing a second functional group;

preparing a first compound containing a third functional group; and performing a cross-linking reaction by mixing the first copolymer, the second copolymer, and the first compound, wherein the cross-linking reaction includes a reaction of the first functional group and the second functional group, and a reaction of the second functional group and the third functional group, the first compound includes a polar group and any one group selected from among a vinyl group, an aryl group, and an acrylate group, the first compound includes one selected from among tri(ethylene glycol)divinyl ether, ethylene glycol diacrylate, di(ethylene glycol)diacrylate, tri(ethylene glycol)diacrylate, tetra(ethylene glycol)diacrylate, acrylonitrile, acrylic acid, vinyl acetate, ethyl vinyl ether, ethylene glycol vinyl ether, 1,4-butanediol vinyl ether, sodium acrylate, sodium allylsulfonate, vinyl acetic acid, 4-vinylbenzenesulfonate, and 2-methyl-2-propene-1-sulfonic acid sodium salt, and the third functional group has reactivity with respect to the second functional group, but does not have reactivity with respect to the first functional group.

2. The method of claim 1, wherein the first functional group and the third functional group each are a vinyl group, and the second functional group is a hydridosilyl group.

3. The method of claim 1, wherein the cross-linking reaction includes a hydrosilylation.

4. The method of claim 1, wherein the first copolymer and the second copolymer each contain polysiloxane.

5. The method of claim 1, wherein the first copolymer includes a first polymer and a second polymer, wherein the first polymer contains a polymerizing unit represented by Formula 1 below:

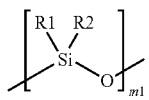

[Formula 1]

wherein, in Formula 1, R1 is represented by Formula 2 below, R2 is halogen, a linear or branched alkyl group having 1 to 5 carbon atoms, or a substituted or unsubstituted phenyl group having 6 to 13 carbon atoms, and m1 is an integer of 1 to 500, and

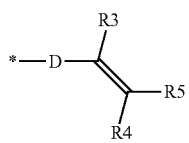

[Formula 2]

wherein, in Formula 2, * is a part connected to Si in Formula 1, D is a single bond, a linear or branched alkyl group having 1 to 5 carbon atoms, a carbonyl group, an ester group, an acetate group, an amide group, or —S—CO, and R3, R4, and R5 are each independently hydrogen, halogen, or a linear or branched alkyl group having 1 to 5 carbon atoms.

6. The method of claim 5, wherein the second polymer contains a polymerizing unit represented by Formula 3 below:

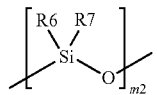

[Formula 3]

wherein, in Formula 3, R6 and R7 are each independently halogen, a linear or branched alkyl group having 1 to 5 carbon atoms, or a substituted or unsubstituted phenyl group having 6 to 13 carbon atoms, and m2 is an integer of 100 to 4,000.

7. The method of claim 1, wherein the first functional group is the same as the third functional group.

8. The method of claim 1, wherein performing the cross-linking reaction by mixing the first copolymer, the second copolymer, and the first compound includes:

producing a polymer film composition by mixing the first copolymer, the second copolymer, and the first compound;

forming the polymer film composition to form a polymer liquid layer; and performing a heat treatment process to the polymer liquid layer to bond the first copolymer to the second copolymer and to bond the second copolymer to the first compound.

9. The method of claim 1, wherein the second copolymer includes a third polymer and a fourth polymer, wherein the third polymer contains a polymerizing unit represented by Formula 5 below:

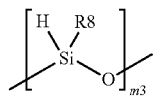

[Formula 5]

wherein in Formula 5, R8 is hydrogen, halogen, a linear or branched alkyl group having 1 to 5 carbon atoms, or a substituted or unsubstituted phenyl group having 6 to 13 carbon atoms, and m3 is an integer of 1 to 1000.

10. The method of claim 9, wherein the first copolymer includes a first polymer and a second polymer, and the fourth polymer is the same as the second polymer.

11. A polymer film composition comprising:

a first copolymer including a first polymer derived from a first monomer and a second polymer derived from a second monomer;

a second copolymer including the second polymer and a third polymer derived from a third monomer; and a first compound, wherein:

the first compound includes a polar group and any one group selected from among a vinyl group, an aryl group, and an acrylate group;

the first compound includes one selected from among tri(ethylene glycol)divinyl ether, ethylene glycol diacrylate, di(ethylene glycol)diacrylate, tri(ethylene glycol)diacrylate, tetra(ethylene glycol)diacrylate, acrylonitrile, acrylic acid, vinyl acetate, ethyl vinyl ether, ethylene glycol vinyl ether, 1,4-butanediol vinyl ether, sodium acrylate, sodium allylsulfonate, vinyl acetic acid, 4-vinylbenzenesulfonate, and 2-methyl-2-propene-1-sulfonic acid sodium salt and the first copolymer and the second copolymer include a polydimethylsiloxane (PDMS)-based polymer.

12. The polymer film composition of claim 11, wherein:
the first polymer contains a first functional group;
the third polymer contains a second functional group having reactivity with respect to the first functional group; and
the first compound contains a third functional group having reactivity with respect to the second functional group, wherein the third functional group does not have reactivity with respect to the first functional group.

13. The polymer film composition of claim 12, wherein the first functional group and the third functional group are a vinyl group, and the second functional group is a hydridosilyl group.

14. The polymer film composition of claim 11, wherein the second polymer contains a polymerizing unit represented by Formula 3 below:

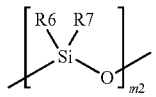

[Formula 3]

wherein, in Formula 3, R6 and R7 are each independently halogen, a linear or branched alkyl group having 1 to 5 carbon atoms, or a substituted or unsubstituted phenyl group having 6 to 13 carbon atoms, and m2 is an integer of 100 to 4,000.

15. A polymer film composition comprising:
a first copolymer including a first polymer derived from a first monomer and a second polymer derived from a second monomer;
a second copolymer including the second polymer and a third polymer derived from a third monomer; and
a first compound,
wherein the first compound includes a polar group and any one group selected from among a vinyl group, an aryl group, and an acrylate group,
wherein the first polymer contains a polymerizing unit represented by Formula 1 below:

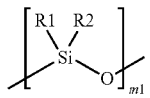

[Formula 1]

wherein, in Formula 1, R1 is represented by Formula 2 below, R2 is halogen, a linear or branched alkyl group having 1 to 5 carbon atoms, or a substituted or unsubstituted phenyl group having 6 to 13 carbon atoms, and m1 is an integer of 1 to 500, and

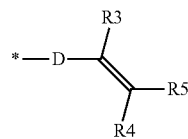

[Formula 2]

wherein, in Formula 2, * is a part connected to Si in Formula 1, D is a single bond, a linear or branched alkyl group having 1 to 5 carbon atoms, a carbonyl group, an ester group, an acetate group, an amide group, or —S—CO, and R3, R4, and R5 are each independently hydrogen, halogen, or a linear or branched alkyl group having 1 to 5 carbon atoms.

16. The polymer film composition of claim 15, wherein the second polymer contains a polymerizing unit represented by Formula 3 below:

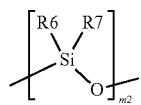

[Formula 3]

wherein, in Formula 3, R6 and R7 are each independently halogen, a linear or branched alkyl group having 1 to 5 carbon atoms, or a substituted or unsubstituted phenyl group having 6 to 13 carbon atoms, and m2 is an integer of 100 to 4,000.

17. The polymer film composition of claim 15, wherein the third polymer contains a polymerizing unit represented by Formula 5 below:

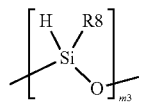

[Formula 5]

wherein in Formula 5, R8 is hydrogen, halogen, a linear or branched alkyl group having 1 to 5 carbon atoms, or a substituted or unsubstituted phenyl group having 6 to 13 carbon atoms, and m3 is an integer of 1 to 1000.

* * * * *